United States Patent
Andrus et al.

(10) Patent No.: US 10,744,949 B2
(45) Date of Patent: Aug. 18, 2020

(54) STORAGE SYSTEM

(71) Applicant: Ford Global Technologies, LLC, Dearborn, MI (US)

(72) Inventors: Michael James Andrus, Northville, MI (US); Chris O'Connor, Livonia, MI (US); Jim Carene, Whitmore Lake, MI (US); Amanda Villerot, Beverly Hills, MI (US); Sue Muscat, South Lyon, MI (US)

(73) Assignee: Ford Global Technologes, LLC, Dearborn, MI (US)

( * ) Notice: Subject to any disclaimer, the term of this patent is extended or adjusted under 35 U.S.C. 154(b) by 78 days.

(21) Appl. No.: 16/214,664

(22) Filed: Dec. 10, 2018

(65) Prior Publication Data
US 2020/0180513 A1 Jun. 11, 2020

(51) Int. Cl.
B60R 5/02 (2006.01)
B60P 7/08 (2006.01)
B60R 7/04 (2006.01)
B60J 1/20 (2006.01)

(52) U.S. Cl.
CPC .............. *B60R 5/02* (2013.01); *B60P 7/0846* (2013.01); *B60R 7/04* (2013.01); *B60J 1/2019* (2013.01)

(58) Field of Classification Search
CPC .. B60R 5/02; B60R 7/04; B60P 7/0846; B60J 1/2019
See application file for complete search history.

(56) References Cited

U.S. PATENT DOCUMENTS

| | | | | |
|---|---|---|---|---|
| 4,214,511 A * | 7/1980 | Mueller | ................ | B65D 90/36 454/182 |
| 6,089,133 A | 7/2000 | Liao | | |
| 6,161,896 A * | 12/2000 | Johnson | ................ | B60R 7/043 297/188.08 |
| 6,302,437 B1 * | 10/2001 | Marriott | ................ | B60R 21/20 280/728.3 |
| 6,893,072 B1 | 5/2005 | Graves | | |
| 7,032,530 B1 * | 4/2006 | Ansay | ...................... | B63G 8/28 114/312 |
| 7,984,746 B2 | 7/2011 | Gao et al. | | |
| 8,616,411 B1 * | 12/2013 | St. Germain | .......... | B65D 35/32 222/106 |
| 9,156,334 B1 | 10/2015 | Robins et al. | | |
| 2004/0045329 A1 * | 3/2004 | Farnham | ............ | E05B 73/0005 70/63 |
| 2011/0233951 A1 * | 9/2011 | Zekavica | ............... | B60N 2/305 296/24.34 |
| 2015/0197201 A1 * | 7/2015 | Greiner | .................... | B60R 7/08 296/24.34 |
| 2015/0264887 A1 * | 9/2015 | Parness | ................ | B60N 2/6027 297/180.14 |
| 2018/0297533 A1 * | 10/2018 | Mozurkewich | ...... | B60N 2/4263 |
| 2019/0232878 A1 * | 8/2019 | Welch | ...................... | B60N 2/02 |

FOREIGN PATENT DOCUMENTS

CA 2746248 A1 * 12/2012 ............. E05F 11/04

* cited by examiner

Primary Examiner — Lori L Lyjak
(74) Attorney, Agent, or Firm — David Coppiellie; Price Heneveld LLP

(57) ABSTRACT

A vehicle including a storage bin and a restraint control system. An actuation assembly is configured to activate in response to a signal from the restraint control system. A tether is operable between undeployed and deployed positions and the actuation assembly is configured to deploy the tether over an opening defined by the storage bin.

20 Claims, 8 Drawing Sheets

STORAGE SYSTEM

FIELD OF THE DISCLOSURE

The present disclosure generally relates to a storage system, and more specifically a vehicle storage system having a deployable cover.

BACKGROUND OF THE DISCLOSURE

Vehicle passengers may choose to bring their luggage and personal items into an interior compartment of the vehicle where there is no storage space available that restrains the luggage and other items. A storage system may be desirable.

SUMMARY OF THE DISCLOSURE

According to at least one feature of the present disclosure, a vehicle includes a storage bin. The vehicle further includes a restraint control system and an actuation assembly configured to activate in response to a signal from the restraint control system. Additionally, a tether is operable between undeployed and deployed positions and the actuation assembly is configured to deploy the tether over an opening defined by the storage bin.

According to another feature of the present disclosure, a vehicle storage system includes a storage bin and a deployable cover coupled to a tensioning apparatus via a tether. Further, the vehicle storage system includes a controller configured to actuate the tensioning apparatus to deploy the cover in response to a signal from a restraint control system.

According to another feature of the present disclosure, a vehicle storage system includes a storage bin and a cover coupled to a top portion of the storage bin. The cover includes a tether coupled to a wheel and axle system. Further, the vehicle storage system includes a controller configured to actuate the wheel and axle system to deploy the cover in response to a signal from a restraint control system.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

In the drawings.

DETAILED DESCRIPTION OF THE PREFERRED EMBODIMENTS

Additional features and advantages of the disclosure will be set forth in the detailed description which follows and will be apparent to those skilled in the art from the description, or recognized by practicing the disclosure as described in the following description, together with the claims and appended drawings.

Figure 1:
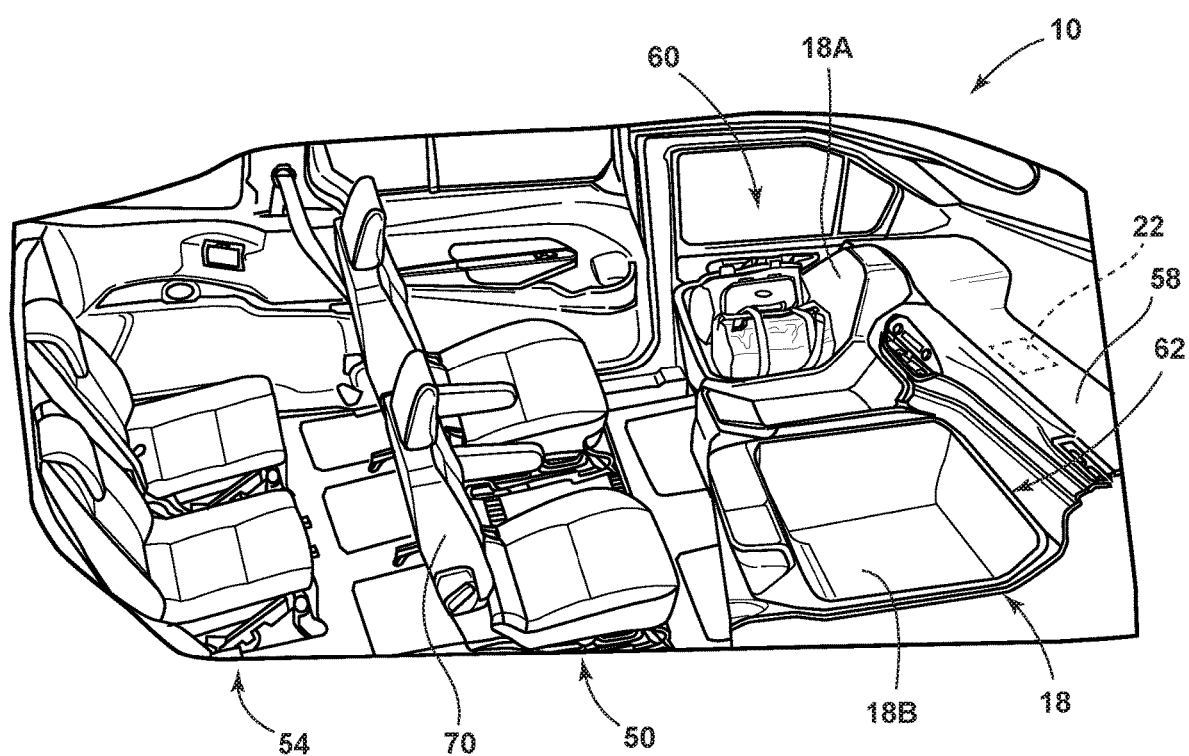
FIG. 1 is a perspective side view of an interior of a vehicle, according to at least one example.

For purposes of description herein, the terms "upper," "lower," "right," "left," "rear," "front," "vertical," "horizontal," and derivatives thereof shall relate to the concepts as oriented in FIG. 1. In this document, relational terms, such as first and second, top and bottom, and the like, are used solely to distinguish one entity or action from another entity or action, without necessarily requiring or implying any actual such relationship or order between such entities or actions. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Referring to FIGS. 1-8, depicted is a vehicle 10 including a storage system 14 therein, wherein the storage system 14 includes a storage bin 18. In the depicted example, the vehicle 10 includes a restraint control system 22 and an actuation assembly 26 configured to activate in response to a signal from the restraint control system 22. Further, a tether 30 is operable between undeployed and deployed positions, wherein the actuation assembly 26 is configured to deploy the tether 30 over an opening 34 defined by the storage bin 18. In various examples, a cover 38 may be coupled to the tether 30. The actuation assembly 26 can include a controller 42 and a tensioning apparatus 46.

Referring to FIG. 1, the vehicle 10 depicted includes a first seating row 50 and a second seating row 54. At least one storage bin 18 can be positioned adjacent to a dashboard 58. In such examples, the storage bin 18 may be positioned between the dashboard 58 and the first seating row 50. In autonomous vehicles, the storage bin 18 can be positioned within the vehicle 10 in a driver seat area 60 and/or a passenger seat area 62. In various examples, a first storage bin 18A can be positioned adjacent to a second storage bin 18B within a single seating row. It is contemplated that the storage bin 18 can be included in traditional vehicles and/or vehicles with a lesser or greater number of seating rows. Further, it is contemplated that the storage bin 18 can be positioned in other areas of the vehicle, for example, in the first and/or second seating rows 50, 54.

Figure 5:
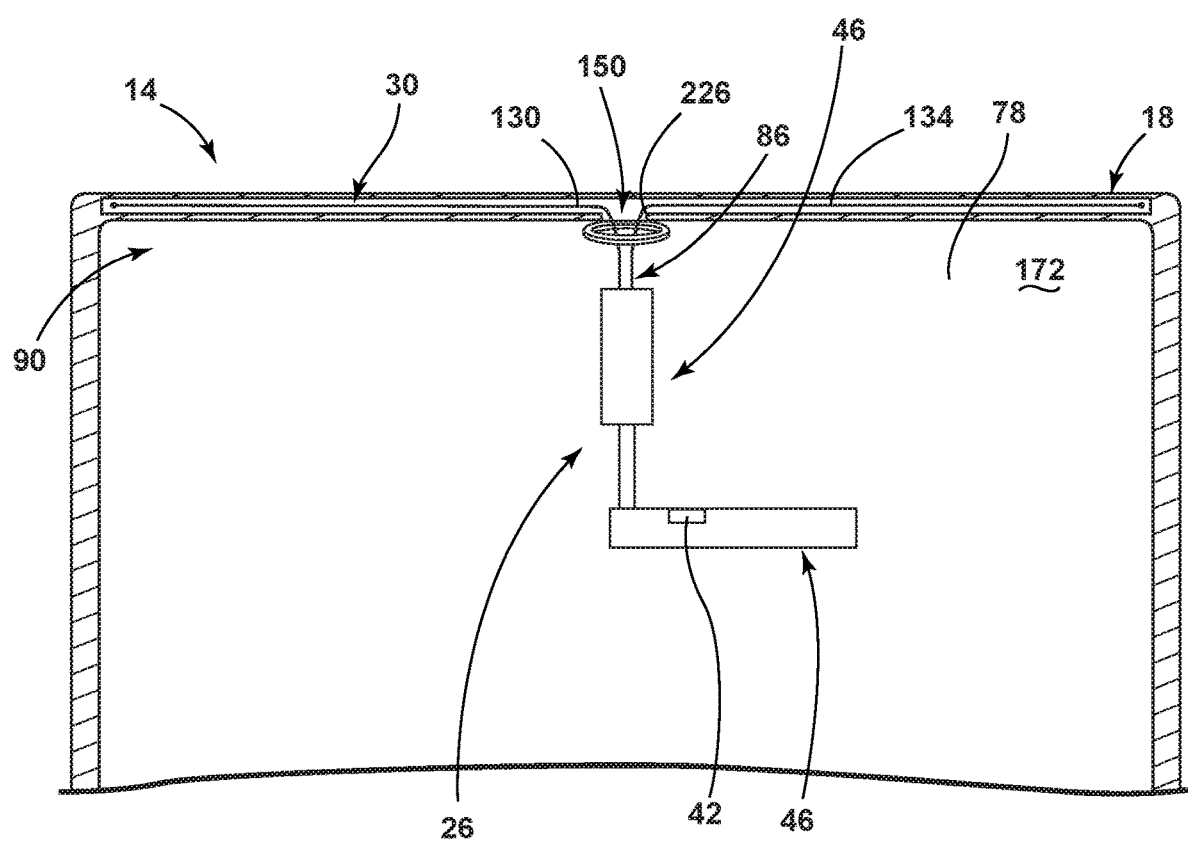
FIG. 5 is a cross-sectional view taken along V-V of an actuation assembly, according to at least one example.

The vehicle 10 includes the restraint control system 22. The restraint control system 22 may be operably coupled to the controller 42 (FIG. 5) within the actuation assembly 26 (FIG. 5). The restraint control system 22 can send a signal to the actuation assembly 26 in response to at least one of a collision detection, an airbag deployment, a seatbelt restraint activation, panic braking identification, and/or anti-lock brake activation, thereby activating the actuation assembly 26.

Figure 2A:
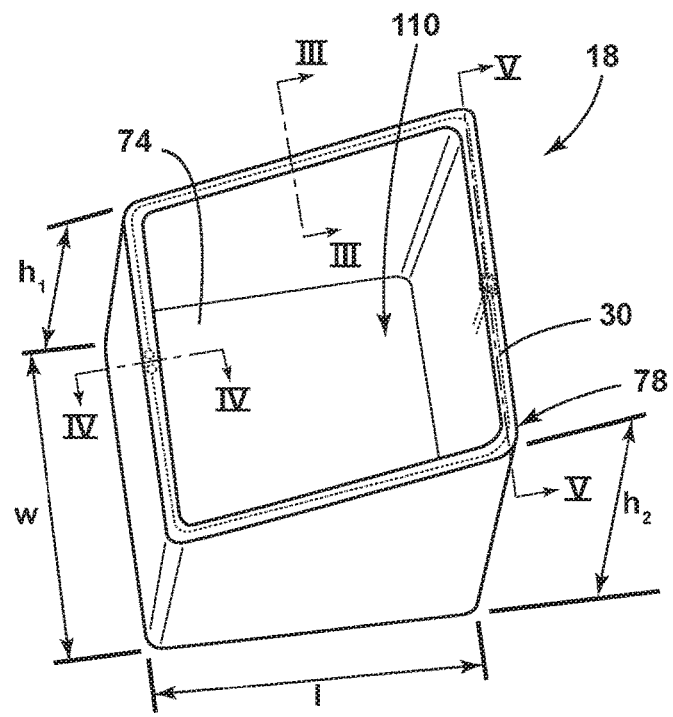
FIG. 2A is a perspective top view of a storage bin, according to at least one example.
Figure 2B:
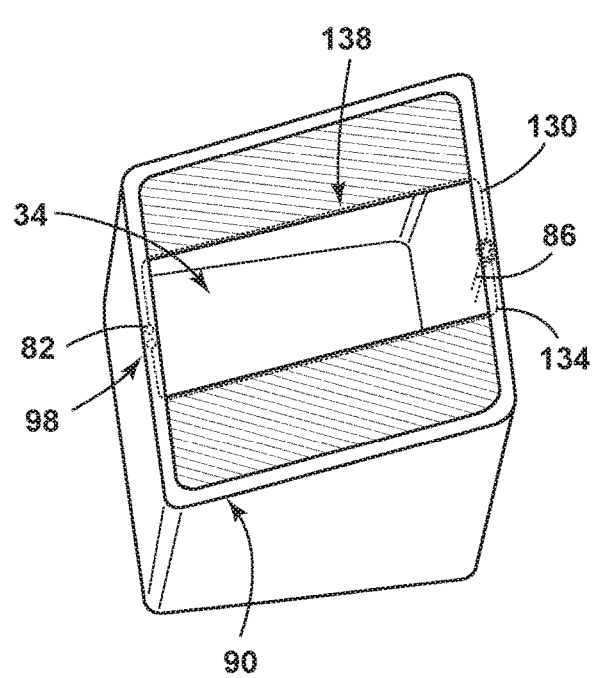
FIG. 2B is a perspective top view of the storage bin and a deployable cover, according to at least one example.
Figure 2C:
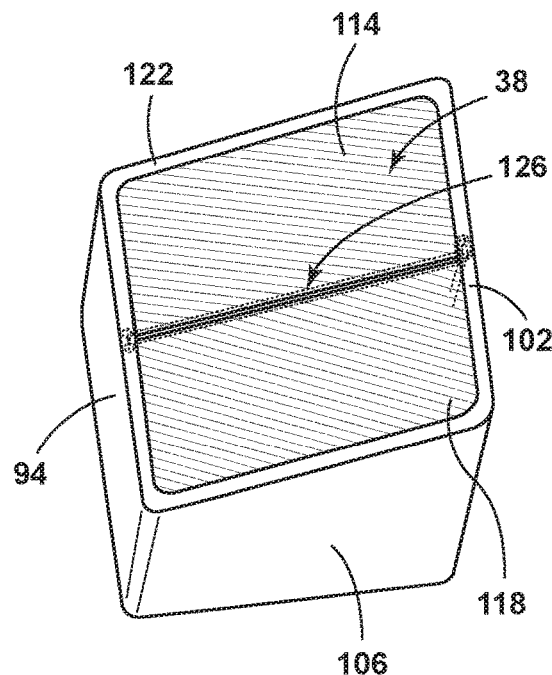
FIG. 2C is a perspective top view of the storage bin and the deployable cover, according to at least one example.

With reference to FIGS. 2A-2C, the storage bin 18 can replace a seat 70 (FIG. 1) within the vehicle 10. The storage bin 18 can include a floor 74 coupled to a sidewall 78. In the depicted example, the storage bin 18 is a quadrilateral shape having a width w of 24-inches, a length l of 24-inches, a vehicle-rearward height $h_1$ of 20-inches, and a vehicle-forward height $h_2$ of 24-inches. In such an example, the length l and width w are based on exemplary space of seats in the driver and passenger seat areas 60, 62 (FIG. 1). Further, the storage bin 18 having the length and width of 24-inches by 24-inches can accommodate personal and carry-on luggage based on airline industry standards. It will be understood that the dimensions of the storage bin 18 can differ based on the make and model of the vehicle 10 (FIG. 1) and/or the size of the items to be held within the storage bin 18. Additionally, the storage bin 18 may be a circle, oval, triangle, square, rectangle, or any other higher order polygon. In various examples, the storage bin 18 can be formed from, for example, fiberglass, plastics, metals, and/or metal alloys.

Referring still to FIGS. 2A-2C, the tether 30 has a fixed end 82 and a movable end 86. The tether 30 can be, for example, rope, wire, chain, cable, and/or cord. The fixed end 82 of the tether 30 may be coupled to a top edge portion 90 of a first sidewall 94 towards a center portion 98 of the first sidewall 94. The movable end 86 can be coupled to a second sidewall 102 of the storage bin 18, where the second sidewall 102 opposes the first sidewall 94. The tether 30 can be operable between deployed and undeployed positions. In such examples, when the tether 30 is in the undeployed position, the tether 30 is positioned adjacent to a third sidewall 106 of the storage bin 18, where the third sidewall 106 is positioned between and coupled to the first and second sidewalls 94, 102.

In the depicted example, the tether 30 is coupled to the cover 38, wherein the cover 38 can be operable between deployed and undeployed positions to cover the opening 34 defined by the storage bin 18 for retaining items within an interior 110 of the storage bin 18 in the event of a vehicle accident, braking, and/or maneuvering. In such examples, the cover 38 can be stored adjacent to the third sidewall 106 of the storage bin 18 when in the undeployed position, as shown in FIG. 2A. In various examples, the cover 38 can be configured to deploy in vehicle-forward, vehicle-rearward, vehicle-inboard, and/or vehicle-outboard directions. It is contemplated that the cover 38 can be stored adjacent to the first, second, and/or third sidewalls 94, 102, 106 of the storage bin 18 when in the undeployed position. In an example where the cover 38 is stored adjacent to the first sidewall 94, the fixed end 82 of the tether 30 can be coupled to the cover 38, such that when the tether 30 is moved from the undeployed position to the deployed position the cover 38 is configured to extend away from the first sidewall 94 and over the opening 34 defined by the storage bin 18. Further, the cover 38 can extend across at least a portion of the opening 34 defined by the storage bin 18 when in the deployed position, as shown in FIGS. 2B and 2C. In various examples, the cover 38 need not fully cover the opening 34. For example, the cover 38 may reduce the size of the opening 34 to retain the items within the storage bin 18. It may be advantageous to reduce the opening 34 of the storage bin 18 rather than fully cover the opening 34 to provide for quicker effectiveness of the cover 38 and reduce concerns about other items being closed into the storage bin 18. The cover 38 can be formed from a flexible material such as, for example, fabrics, mesh, netting, fish-netting, and/or metals (e.g., aluminum). In various examples, the cover 38 can be formed of nylon fabric similar to the material of a vehicle airbag.

With further reference to FIGS. 2A-2C, the cover 38 can include a first cover panel 114 and a second cover panel 118. In the depicted example, the first and second cover panels 114, 118 may be stored adjacent to the third sidewall 106 and a fourth sidewall 122 opposing the third sidewall 106, respectively, such that the first and second cover panels 114, 118 move towards a center 126 of the storage bin 18 when moving to the deployed position. In other words, the cover 38 can include the first cover panel 114 and the second cover panel 118 configured to extend from opposing sidewalls 78 of the storage bin 18 towards the center 126 of the storage bin 18. In such an example, the first and second cover panels 114, 118 may be coupled to a first tether 130 and a second tether 134, respectively. The first and second tethers 130, 134 can be coupled to an interior edge portion 138 of the first and second cover panels 114, 118. In the depicted example, the tether 30 may include first and second tethers 130, 134 that cooperate with the first and second cover panels 114, 118, respectively. The first and second tethers 130, 134 may be coupled to the same sidewall 78 of the storage bin 18. In various examples, the first cover panel 114 may be coupled to a first portion of a perimeter of the storage bin 18 and the second cover panel 118 may be coupled to a second portion of the perimeter of the storage bin 18.

Figure 3A:
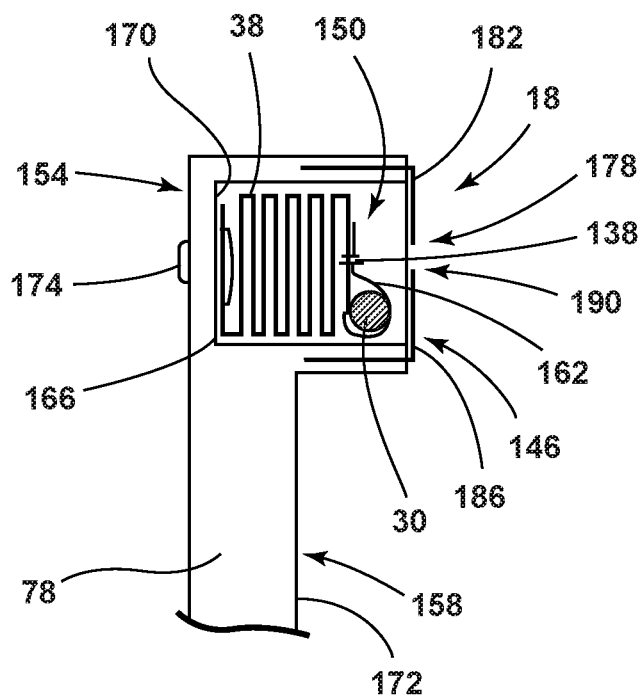
FIG. 3A is a cross-sectional view taken along of the deployable cover in an undeployed position and a sidewall of the storage bin, according to at least one example.
Figure 3B:
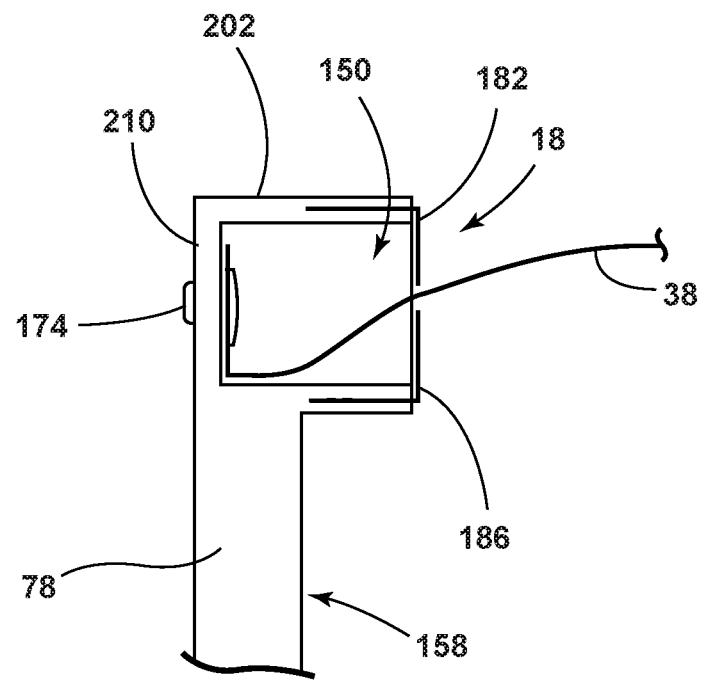
FIG. 3B is a cross-sectional view taken along of the deployable cover in a deployed position and the sidewall of the storage bin, according to at least one example.

Referring to FIGS. 3A and 3B, the cover 38 is shown in the undeployed and deployed positions, respectively. When in the undeployed position, the cover 38 can be hidden within the sidewall 78, as shown in FIG. 3A. When in the undeployed position, a flexible door 146 can be opened as the tether 30 and/or cover 38 is moved to the deployed position by the actuation assembly 26 (FIG. 5), as shown in FIG. 3B. In other words, the flexible door 146 can extend over the cavity 150 defined by the sidewall 78.

An upper portion 154 of the sidewall 78 of the storage bin 18 can define a cavity 150 therein. In various examples, the deployable cover 38 can be housed within the cavity 150 when in the undeployed position. The upper portion 154 of the sidewall 78 may have a width greater than a width of a lower portion 158 of the sidewall 78 to accommodate the cavity 150. It is contemplated that the width of the sidewall 78 can be substantially uniform while accommodating the cavity 150 therein. The cover 38 can be folded and stored into the cavity 150 when in the undeployed position. The interior edge portion 138 of the cover 38 can be slidably coupled to the tether 30. In various examples, the cover 38 can include an elongated channel 162 for housing the tether 30 therein. In other words, the interior edge portion 138 of the cover 38 can include the elongated channel 162. The elongated channel 162 may be a semi-rigid channel embedded within the cover 38. An exterior edge portion 166 of the cover 38 can be coupled to an internal surface 170 of the cavity 150 of the sidewall 78 by a fastener 174. The fastener 174 may be horizontally aligned with the access point 178 with the cover 38 folded and stored therebetween. In various examples, the fastener 174 can be positioned in the lower portion 158 of the cavity 150, coupling the cover 38 to the sidewall 78. The fastener 174 can be, for example, a screw, snap, and/or nut and bolt. The fastener 174 can extend through the sidewall 78 and be secured by an additional fastener 174 on the outer surface 210 of the storage bin 18. In additional examples, the fastener 174 may extend into the sidewall 78 to secure the cover 38 to the sidewall 78.

Referring still to FIGS. 3A and 3B, an access point 178 of the cavity 150 can be defined by an inner surface 172 of the sidewall 78 and directed to the interior 110 (FIG. 2A) of the storage bin 18. The access point 178 can be covered by the flexible door 146. The flexible door 146 may include a first panel 182 and a second panel 186. The first and second panels 182, 186 can define a path 190 therebetween for the tether 30 and cover 38 to move through when being deployed. The first and second panels 182, 186 can be coupled to the sidewall 78 by, for example, fasteners and/or adhesives. In the depicted example, the first and second panels 182, 186 of the flexible door 146 are inserted into the sidewall 78, extending horizontally with the sidewall 78 and then vertically over the access point 178. It is contemplated that the first and second panels 182, 186 can be positioned adjacent a top and bottom of the cavity 150 and/or adjacent to a side of the cavity 150. In various examples, the flexible door 146 includes a single panel that extends over at least a portion of the access point 178. In such examples, the flexible door 146 may be a single panel, formed of, for example, flexible plastics, having a score line. The tether 30 and/or cover 38 may separate the flexible door 146 at the score line as the tether 30 and/or cover 38 move to the deployed position.

In additional examples, the access point 178 may be defined by a top surface 202 of the sidewall 78. The flexible door 146 can be coupled to an outer surface 210 of the storage bin 18. In such examples, an interior portion of the flexible door 146 can be detachably coupled to the sidewall 78 and/or positioned on the top surface 202 of the sidewall 78. The flexible door 146 may be detachably coupled by, for example, adhesive, touch fastener (e.g., Velcro), and/or magnets. The flexible cover 38 may include a weighted end, such that the weight allows the flexible door 146 to remain closed until a force of the tether 30 (FIG. 3A) and/or the cover 38 moving to the deployed position opens the flexible door 146. It is also contemplated that the interior portion of the flexible door 146 can be coupled to the sidewall 78 and an exterior portion of the flexible door 146 can be detachably coupled to the sidewall 78. In additional examples, the interior and exterior portions of the flexible door 146 may both be coupled to the sidewall 78.

Still referring to FIGS. 3A and 3B, portions of the cover 38 may not be coupled to the sidewall 78. In such examples, the cover 38 can be fully removed from the cavity 150 when in the deployed position. It is contemplated that portions of the cover 38 may remain in the cavity 150 when the cover 38 is in the deployed position without being coupled to the sidewall via the fastener 174 (FIG. 3A). The cover 38 can be folded into the cavity 150 in a similar manner as when the cover 38 is coupled to the sidewall 78. In various examples, the cover 38 can be reinserted into the cavity 150 for reuse. Additionally, a new replacement cover 38 can be installed into the storage bin 18 after each use and/or after multiple uses.

Figure 4A:
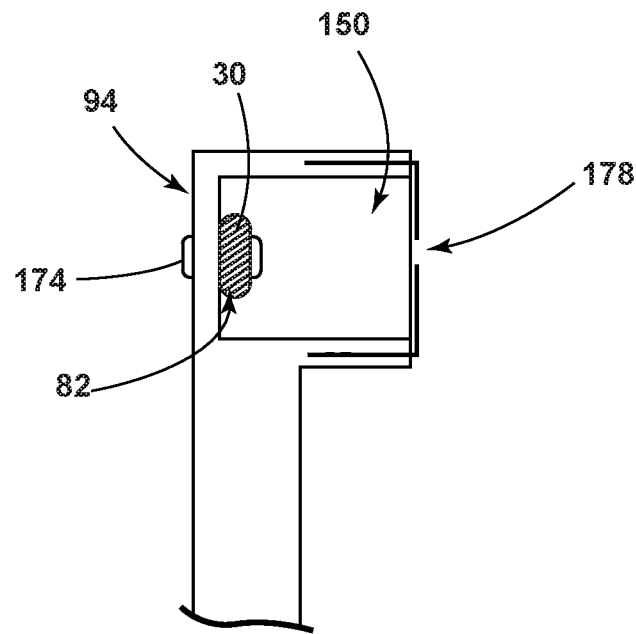
FIG. 4A is a cross-sectional view taken along IV-IV of a tether in the undeployed position and the sidewall of the storage bin, according to at least one example.
Figure 4B:
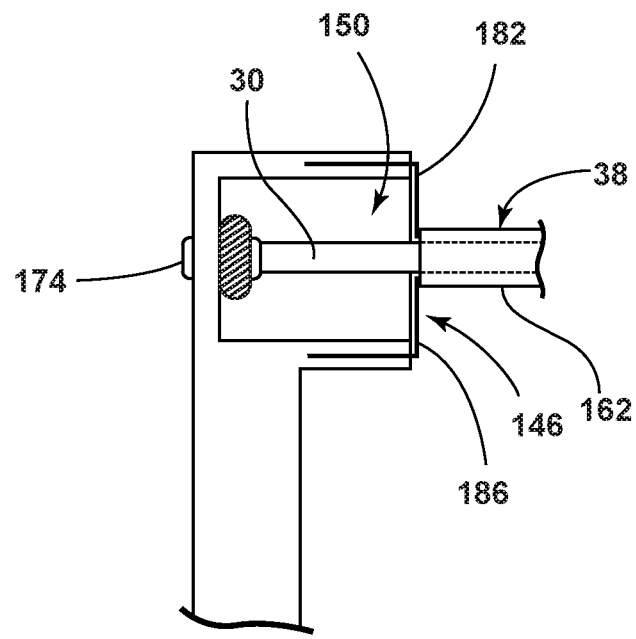
FIG. 4B is a cross-sectional view taken along IV-IV of the tether in the deployed position and the sidewall of the storage bin, according to at least one example.

Referring now to FIGS. 4A and 4B, in various examples, the tether 30 may be stored adjacent to the first sidewall 94 and/or within the cavity 150 defined by the first sidewall 94. In such examples, the cover 38 (FIG. 2A) may be stored adjacent to the third and fourth sidewalls 106, 122 (FIG. 2C) and may not be stored adjacent to the first and second sidewalls 94, 102 (FIG. 2C). The fixed end 82 of the tether 30 may be coupled proximate to the center portion 98 (FIG. 2B) of the first sidewall 94. When in the undeployed position, as shown in FIG. 4A, the tether 30 may extend from the center portion 98 of the first sidewall 94 around the perimeter of the storage bin 18 (FIG. 1) to the second sidewall 102. In such examples, the tether 30 may be stored adjacent to the third or fourth sidewalls 106, 122 (FIG. 2C). In examples including the first and second tethers 130, 134 (FIG. 2B), the first tether 130 may be stored adjacent to the third sidewall 106 and the second tether 134 may be stored adjacent to the fourth sidewall 122. When in the deployed position, as shown in FIG. 4B, the tether 30 can extend out of the cavity 150 and through the access point 178 between the first and second panels 182, 186 of the flexible door 146. Additionally, the tether 30 can move through the elongated channel 162 of the cover 38 until the tether is substantially taut.

Referring now to FIG. 5, the storage system 14 can include the actuation assembly 26 coupled to the inner surface 172 of the sidewall 78 of the storage bin 18. It is contemplated that the actuation assembly 26 can be coupled to the outer surface 210 (FIG. 3B) of the storage bin 18. In the depicted example, the movable end 86 of the first and second tethers 130, 134 are coupled to the actuation assembly 26. The tether 30 can be coupled to the storage bin 18 on an opposing side of the storage bin 18 compared to the actuation assembly 26 having the controller 42 and/or tensioning apparatus 46. The actuation assembly 26 may be configured to displace the first and second tethers 130, 134. Additionally, the first and second cover panels 114, 118 (FIG. 2B) can be moved from the undeployed position to the deployed position by the actuation assembly 26. In such examples, the actuation assembly 26 can be configured to deploy the tether 30 over the opening 34 (FIG. 2B) defined by the storage bin 18.

In the depicted example, a guide member 226 is positioned near the top edge portion 90 of the sidewall 78. The guide member 226 can be configured to direct movement of the tether 30 as the tether is displaced by the actuation assembly 26. In other words, the guide member 226 is coupled to the top edge portion 90 of the storage bin 18 and configured to guide the tether 30 to the actuation assembly 26, and as a result, to the tensioning apparatus 46. It may be advantageous to include the guide member 226 such that the tether 30 follows the desired path to enable full deployment of the cover 38. In various examples, the guide member 226 can be a channel and/or gap formed by the cavity 150 and/or defined by the sidewall 78, wherein the tether 30 can move along the channel to the actuation assembly 26.

The actuation assembly 26 may include the controller 42 and at least one tensioning apparatus 46. In other words, the storage bin 18 can include a deployable cover 38 (FIG. 2B) coupled to the tensioning apparatus 46 via the tether 30. The actuation assembly 26 can be configured to activate in response to a signal from the restraint control system 22 (FIG. 1). In such an example, the actuation assembly 26 will activate to displace the tether 30 and thereby deploy the cover 38 (FIG. 2B).

Referring again to FIG. 5, in various examples, the controller 42 can be operably coupled to the tensioning apparatus 46 and the restraint control system 22 (FIG. 1). In the depicted example, the controller 42 is configured to actuate the tensioning apparatus 46 to deploy the cover 38 (FIG. 2B) in response to a signal from the restraint control system 22 (FIG. 1). As set forth previously, the signal from the restraint control system 22 (FIG. 1) can be from, for example, a collision detection, an airbag deployment, a seatbelt restraint activation, panic braking identification, and/or anti-lock brake activation. The tensioning apparatus 46 can be a single-use apparatus or may be configured to reset and be reused.

Figure 6:
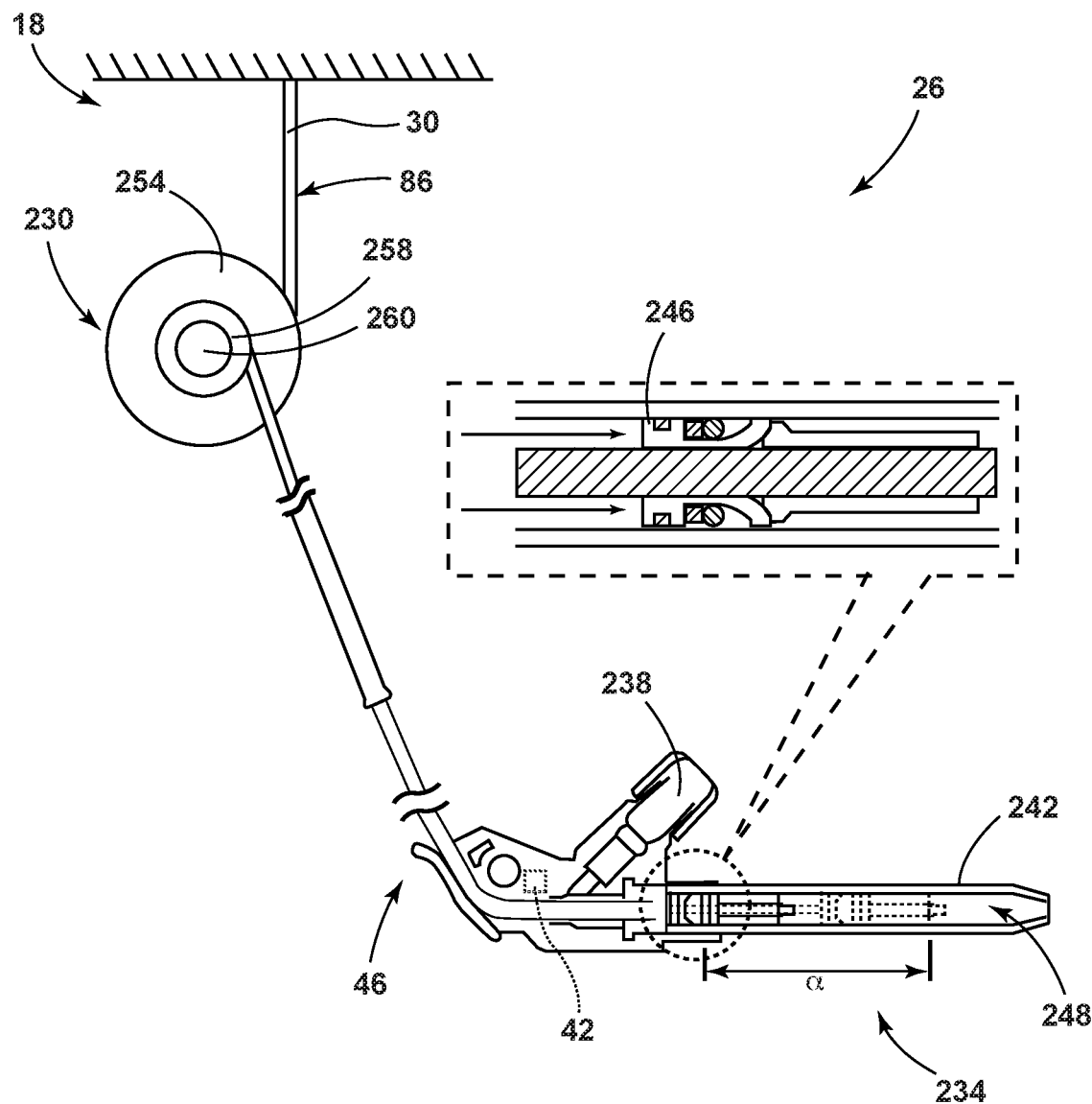
FIG. 6 is a partial view of the actuation assembly, according to at least one example.

Referring to FIG. 6, the tensioning apparatus 46 can include a wheel and axle system 230 and a pretensioner 234 (e.g., a seatbelt pretensioner). In such an example, the controller 42 is configured to actuate the wheel and axle system 230 and/or the pretensioner 234 to deploy the cover 38 (FIG. 2B) in response to a signal from the restraint control system 22 (FIG. 1). The time required to partially and/or fully deploy the cover 38 can differ depending on the type and/or amplitude of the signal from the restraint control system 22.

In various examples, the pretensioner 234 can include a gas generator 238 coupled to a housing 242 with a piston 246 positioned therein, wherein the tether 30 can be coupled to the piston 246. In such examples, a signal to the controller 42 from the restraint control system 22 can result in ignition of the gas generator 238, which can then begin the retraction of the tether 30. Gas pressure from the ignition of the gas generator 238 can cause the piston 246 to move along an interior 248 of the housing 242 in a direction opposite the gas generator 238. As a result, the tether 30 attached to the piston 246 is displaced the distance a the piston 246 travels. It is also contemplated that the pretensioner 234 can be used with a rack and pinion assembly. In various examples, the pretensioner 234 can have about 4-inches to about 8-inches of displacement of the tether 30. Use of the pretensioner 234 can be advantageous in terms of costs and labor as the pretensioner 234 is compatible with the restraint control system 22 (FIG. 1) of vehicles currently in production.

To increase the ideal mechanical advantage of the actuation assembly 26, the pretensioner 234 can be combined with another tensioning apparatus 46, such as the wheel and axle system 230, which can increase the displacement of the tether 30. In the depicted example, the wheel and axle system 230 can provide approximately a 3-to-1 mechanical advantage. Accordingly, if the pretensioner 234 provided 4-inches of displacement, the total displacement when utilizing both the pretensioner 234 and the wheel and axle system 230 would be 12-inches. As set forth previously, the storage bin 18 (FIG. 1) in the depicted example has a length of 24-inches and a width of 24-inches, resulting in a half-perimeter of 48-inches. In such an example, the tensioning apparatus 46 would need to displace 24-inches of the tether 30 to fully deploy the cover 38 (FIG. 2B) such that the cover 38 extends over the entire opening 34 defined by the storage bin 18 and is taut across the center 126 (FIG. 2C) of the storage bin 18. As a result, two tensioning apparatuses 46 having the pretensioner 234 and the wheel and axle system 230 could be coupled to opposing sidewalls 78 (FIG. 2A) of the storage bin 18 to provide for the 24-inches of displacement. In this example, the tether 30 may have two opposing movable ends 86 such that the tether 30 could be displaced from both ends.

In another example, the pretensioner 234 can provide 8-inches of displacement. In such an example, use of the wheel and axle system 230 would provide a 3-to-1 mechanical advantage, resulting in 24-inches of displacement. In this example, one tensioning apparatus 46 having the pretensioner 234 and the wheel and axle system 230 would result in the 24-inches of displacement desired for the storage bin 18 having a 24-inches length and a 24-inches width. It is contemplated that the number of tensioning apparatuses 46 and the distance a of displacement can differ depending on the dimensions of the storage bin 18.

Still referring to FIG. 6, the wheel and axle system 230 can include a first pulley 254 and a second pulley 258 coupled together such that a center of the first pulley 254 corresponds with a center of the second pulley 258. In various examples, the first pulley 254 can have a radius of about 3-inches, the second pulley 258 has a radius of about 1-inch, and an axle 260 has a radius of about ½-inch. In such an example, the wheel and axle system 230 can provide the 3-to-1 ideal mechanical advantage, resulting in a displacement of 12-inches of the tether 30 when the pretensioner 234 provides 4-inches of displacement and a displacement of 24-inches of the tether 30 when the pretensioner 234 provides 8-inches of displacement. It is contemplated that the dimensions of the wheel and axle system 230 and the displacement caused by the pretensioner 234 can differ depending on the dimensions of the storage bin 18.

Figure 7:
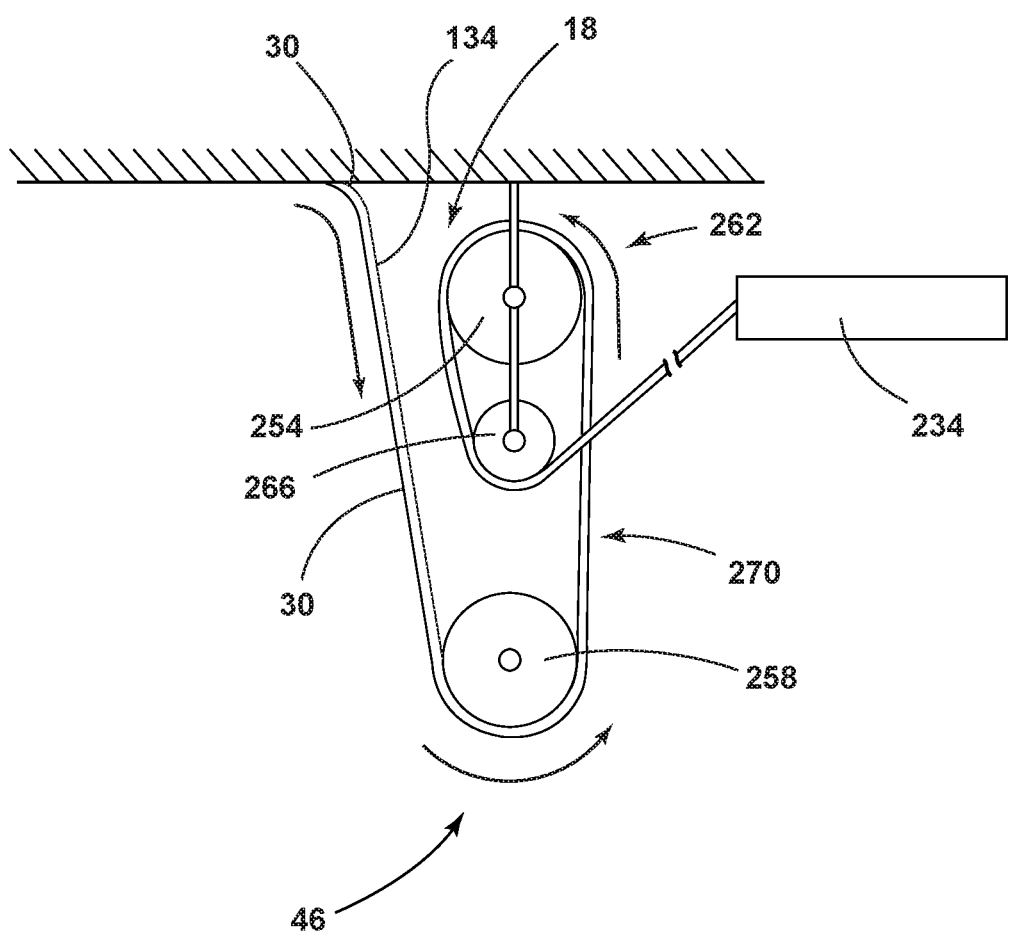
FIG. 7 is a partial view of the actuation assembly, according to at least one example.

Referring now to FIG. 7, the tensioning apparatus 46 can include the pretensioner 234 and a pulley system 262. The pulley system 262 can provide approximately a 3-to-1 mechanical advantage similar to the mechanical advantage of the wheel and axle system 230 (FIG. 6). In the depicted example, the pulley system 262 includes the first pulley 254, the second pulley 258, and a third pulley 266 therebetween, where the first pulley 254 is anchored to the storage bin 18 and the second and third pulleys 258, 266 are movable. The first and second pulleys 254, 258 can have similar radii and the third pulley 266 can have a smaller radius compared to the first and second pulleys 254, 258. In one example, the pretensioner 234 can cause a downward force on the tether 30 within the pulley system 262 of approximately 100 newtons, causing approximately 33.3 newtons of force to be distributed to each substantially vertically-oriented portion 270 of the tether 30 in the pulley system 262. One hundred newtons of force is caused by the pretensioner 234 providing approximately 4-inches (approximately 10 centimeters) of displacement and results in approximately 12-inches (approximately 30 centimeters) of displacement of the tether 30. It is contemplated that the configuration of the pulley system 262 and the displacement caused by the pretensioner 234 can differ depending on the dimensions of the storage bin 18. It is also contemplated that more than one tensioning apparatus 46 including the pulley system 262 and pretensioner 234 can be utilized to provide additional displacement of the tether 30.

In various examples, the first and second tethers 130, 134 (FIG. 2B) can be utilized with the pulley system 262 and can have two opposing fixed ends 82 (FIG. 2B). The fixed end 82 adjacent to the pulley system 262 can be inserted through the first pulley 254 and coupled to the storage bin 18 on the opposite side of the first pulley 254. For example, the first tether 130 can enter the pulley system 262 from the vehicle-inboard side of the pulley system 262 and attach to the storage bin 18 on the vehicle-outboard side of the pulley system 262. In such an example, the stroke of the pretensioner 234 can be increased by approximately a factor of two (e.g., doubles the stroke distance).

Figure 8:
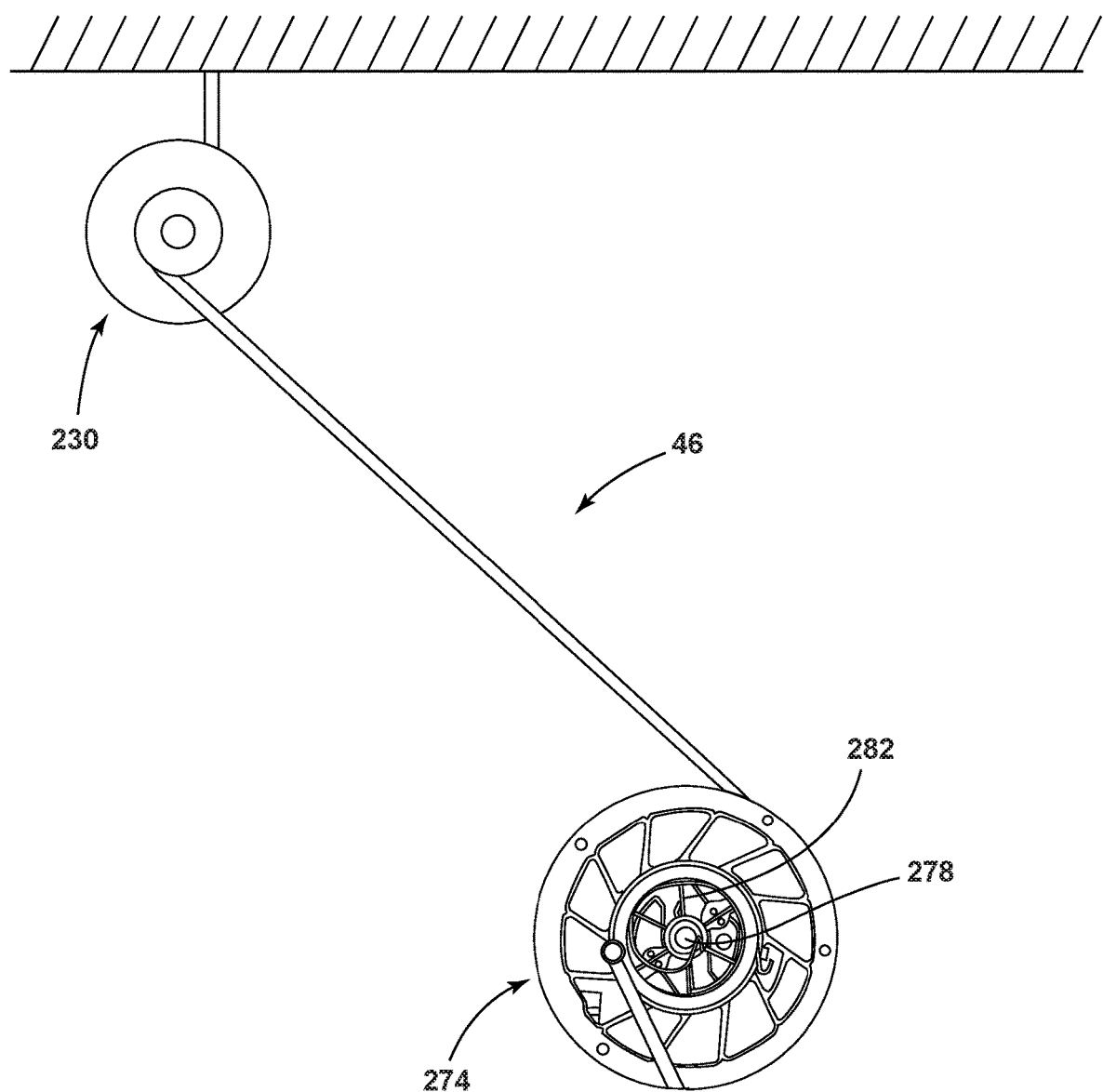
FIG. 8 is a partial view of the actuation assembly, according to at least one example.

Referring to FIG. 8, the tensioning apparatus 46 may include a clock spring 274 coupled to a solenoid 278. In various examples, the clock spring 274 can be utilized in conjunction with the pulley system 262 (FIG. 7), the wheel and axle system 230, and/or a combination thereof. The clock spring 274 can be configured to rotate the pulley system 262 (FIG. 7) and/or the wheel and axle system 230 when stored energy of a spring 282 is released. In other words, the clock spring 274 can be coupled to the solenoid 278, wherein the clock spring 274 can be activated by a signal sent from the restraint control system 22 to the solenoid 278, which releases the stored energy of the spring 282. The clock spring 274 can provide sufficient revolutions to provide approximately 24-inches of displacement, which is desired when the storage bin has a length of 24-inches and a width of 24-inches as in the depicted example. In such an example, a single clock spring 274 could be used for the entire desired displacement, however, it is contemplated that additional clock springs 274 can be used to increase the amount of displacement. Use of the clock spring 274 may be advantageous as the clock spring 274 can be reset and reused, which could reduce costs of repair.

Referring to FIGS. 5-8, in various examples, the cover 38 may be coupled to the top edge portion 90 of the storage bin 18, wherein the cover 38 includes the tether 30 coupled to at least one of the pretensioner 234, the wheel and axle system 230, the pulley system 262, and/or the clock spring 274. It is also contemplated that the tensioning apparatus 46 could include, for example, a linear actuator, a fast-acting linear actuator, and/or a spring-loaded actuator. In examples where the storage bin 18 includes the first and second tethers 130, 134, both the first and second tethers 130, 134 can be coupled to the tensioning apparatus 46 and displaced similarly.

In operation, the storage system 14 is positioned within the vehicle 10 having the restraint control system 22. When a triggering event occurs (e.g., a crash, braking, etc.), the restraint control system 22 can send a signal to the controller 42 of the actuation assembly 26. The controller 42 activates the tensioning apparatus 46, which can include at least one of the pretensioner 234, the wheel and axle system 230, the pulley system 262, and the clock spring 274. The tensioning apparatus 46 applies force to the tether 30, causing the tether 30 to be removed from the cavity 150 within the sidewall 78 and moved through the guide member 226 to the tensioning apparatus 46. In this configuration, the tether may move from the undeployed position to the deployed position across the opening 34 of the storage bin 18. The tether 30 can be coupled to the cover 38 and, therefore, as the tether 30 is moved by the tensioning apparatus 46 the cover 38 is also moved over the opening 34 of the storage bin 18. As a result, the cover 38 deploys over the storage bin 18 and is configured to prevent items from leaving the storage bin 18.

Use of the present disclosure may offer a variety of advantages. First, the storage system 14 provides the storage bin 18 with the deployable cover 38 that can act as a passive restraint to luggage and other items positioned within the storage bin 18. In conventional vehicles, passengers bring luggage and personal items into an interior compartment and leave the luggage unrestrained, which can result in the luggage moving. Second, the cover 38 can deploy upon a signal from the restraint control system 22. Conventional containers for holding luggage include doors that must be manually opened and closed, which is inconvenient for timing purposes (e.g., a shuttle service) and can result in forgotten luggage. Third, the storage system 14 may allow for passengers to use the storage bin 18 with minimal or no change to their daily repetitive usage of the vehicle 10. Conventional containers with manual doors require a passenger to change their daily use by opening the container to insert and remove luggage from the container.

According to various examples, a vehicle includes a storage bin. The vehicle further includes a restraint control system and an actuation assembly configured to activate in response to a signal from the restraint control system. Additionally, a tether is operable between undeployed and deployed positions and the actuation assembly is configured to deploy the tether over an opening defined by the storage bin.

the actuation assembly includes a tensioning apparatus and a controller;
the tensioning apparatus includes at least one of a pulley system and a wheel and axle system;
the tensioning apparatus includes at least one of a linear actuator, a pretensioner, and a clock spring;
the restraint control system sends a signal in response to at least one of a collision detection, an airbag deployment, a seatbelt restraint activation, panic braking identification, and anti-lock brake activation;
a cover coupled to the tether;
the cover is configured to deploy in a vehicle-forward direction;
a controller configured to actuate the tensioning apparatus to deploy the cover in response to a signal from a restraint control system;
the tensioning apparatus includes a seatbelt pretensioner;
the tensioning apparatus includes a clock spring operably coupled to a solenoid;
the storage bin includes a sidewall that defines a cavity in an upper portion of the sidewall;
the deployable cover is housed within the cavity when in an undeployed position;
a flexible door extending over the cavity defined by the sidewall;
the tether is coupled to the storage bin on an opposing side of the storage bin compared to the tensioning apparatus;
a guide member coupled to a top edge portion of the storage bin and configured to guide the tether to the wheel and axle system;
the cover includes a first cover panel and a second cover panel configured to extend from opposing sides of the storage bin towards a center of the storage bin;
the first cover panel is coupled to a first portion of a perimeter of the storage bin and the second cover panel is coupled to a second portion of the perimeter;
the tether includes first and second tethers that cooperate with the first and second cover panels, respectively, and wherein the first and second tethers are coupled to a same side of the storage bin; and
an edge portion of the cover includes an elongated channel for housing the tether therein.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims, as interpreted according to the principles of patent law, including the doctrine of equivalents.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A vehicle, comprising:
a storage bin;
a restraint control system;
an actuation assembly configured to activate in response to a signal from the restraint control system; and
a tether operable between undeployed and deployed positions, wherein the actuation assembly is configured to deploy the tether over an opening defined by the storage bin.

2. The vehicle of claim 1, wherein the actuation assembly includes a tensioning apparatus and a controller.

3. The vehicle of claim 2, wherein the tensioning apparatus includes at least one of a pulley system and a wheel and axle system.

4. The vehicle of claim 2, wherein the tensioning apparatus includes at least one of a linear actuator, a pretensioner, and a clock spring.

5. The vehicle of claim 1, wherein the restraint control system sends a signal in response to at least one of a collision detection, an airbag deployment, a seatbelt restraint activation, panic braking identification, and anti-lock brake activation.

6. The vehicle of claim 1, further comprising:
a cover coupled to the tether.

7. The vehicle of claim 6, wherein the cover is configured to deploy in a vehicle-forward direction.

8. A vehicle storage system, comprising:
a storage bin;
a deployable cover coupled to a tensioning apparatus via a tether; and
a controller configured to actuate the tensioning apparatus to deploy the cover in response to a signal from a restraint control system.

9. The vehicle storage system of claim 8, wherein the tensioning apparatus includes a seatbelt pretensioner.

10. The vehicle storage system of claim 8, wherein the tensioning apparatus includes a clock spring operably coupled to a solenoid.

11. The vehicle storage system of claim 8, wherein the storage bin includes a sidewall that defines a cavity in an upper portion of the sidewall.

12. The vehicle storage system of claim 11, wherein the deployable cover is housed within the cavity when in an undeployed position.

13. The vehicle storage system of claim 11, further comprising:
a flexible door extending over the cavity defined by the sidewall.

14. The vehicle storage system of claim 8, wherein the tether is coupled to the storage bin on an opposing side of the storage bin compared to the tensioning apparatus.

15. A vehicle storage system, comprising:
a storage bin;
a cover coupled to a top portion of the storage bin, wherein the cover includes a tether coupled to a wheel and axle system; and a controller configured to actuate the wheel and axle system to deploy the cover in response to a signal from a restraint control system.

16. The vehicle storage system of claim 15, further comprising:
a guide member coupled to a top edge portion of the storage bin and configured to guide the tether to the wheel and axle system.

17. The vehicle storage system of claim 15, wherein the cover includes a first cover panel and a second cover panel configured to extend from opposing sides of the storage bin towards a center of the storage bin.

18. The vehicle storage system of claim 17, wherein the first cover panel is coupled to a first portion of a perimeter of the storage bin and the second cover panel is coupled to a second portion of the perimeter.

19. The vehicle storage system of claim 17, wherein the tether includes first and second tethers that cooperate with the first and second cover panels, respectively, and wherein the first and second tethers are coupled to a same side of the storage bin.

20. The vehicle storage system of claim 15, wherein an edge portion of the cover includes an elongated channel for housing the tether therein.

* * * * *